(12) United States Patent
Lee et al.

(10) Patent No.: US 11,500,441 B2
(45) Date of Patent: Nov. 15, 2022

(54) ELECTRONIC DEVICE AND CONTROL METHOD THEREFOR

(71) Applicant: SAMSUNG ELECTRONICS CO., LTD., Suwon-si (KR)

(72) Inventors: Kwangho Lee, Suwon-si (KR); Cheulhee Hahm, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 105 days.

(21) Appl. No.: 16/960,747

(22) PCT Filed: Jan. 14, 2019

(86) PCT No.: PCT/KR2019/000547
§ 371 (c)(1),
(2) Date: Jul. 8, 2020

(87) PCT Pub. No.: WO2019/151677
PCT Pub. Date: Aug. 8, 2019

(65) Prior Publication Data
US 2020/0341532 A1    Oct. 29, 2020

(30) Foreign Application Priority Data

Feb. 5, 2018  (KR) ......................... 10-2018-0013904

(51) Int. Cl.
*G06F 1/3206*    (2019.01)
*G06F 1/3287*    (2019.01)
(Continued)

(52) U.S. Cl.
CPC .......... *G06F 1/3206* (2013.01); *G06F 1/3287* (2013.01); *H04L 12/10* (2013.01);
(Continued)

(58) Field of Classification Search
CPC ......... H04L 12/10; H04L 29/02; H04L 65/00; H04W 52/028; H04W 52/02; G06F 1/3206; G06F 1/3287
(Continued)

(56) References Cited

U.S. PATENT DOCUMENTS 6,212,175 B1    4/2001  Harsch
8,068,433 B2    11/2011 Hodges et al.
(Continued)

FOREIGN PATENT DOCUMENTS

CN    102640076    8/2012
CN    102739898    10/2012
(Continued)

OTHER PUBLICATIONS

Extended Search Report dated Dec. 17, 2020 in counterpart European Patent Application No. 19748206.0.
(Continued)

*Primary Examiner* — Rownak Islam
(74) *Attorney, Agent, or Firm* — Nixon & Vanderhye, P.C.

(57) ABSTRACT

Disclosed is an electronic apparatus, the electronic apparatus including: a communication circuitry; a power supply; a first processor configured to have a first mode which receives first power from the power supply and connects with a server through the communication circuitry to transmit and receive information, and a second mode which receives no power or second power lower than the first power from the power supply; and a second processor configured to repetitively output a mode switching signal within a preset range of time interval based on the second mode of the first processor, wherein the first processor is switched over to the first mode based on the mode switching signal, is configured to transmit connectivity keeping information to the server through
(Continued)

the communication circuitry and is switched over to the second mode.

13 Claims, 17 Drawing Sheets

(51) Int. Cl.
    *H04L 12/10*     (2006.01)
    *H04W 52/02*     (2009.01)
    *H04L 65/00*     (2022.01)

(52) U.S. Cl.
    CPC ........... *H04L 65/00* (2013.01); *H04W 52/028* (2013.01); *H04W 52/02* (2013.01)

(58) Field of Classification Search
    USPC ........................................................ 370/311
    See application file for complete search history.

(56) References Cited

U.S. PATENT DOCUMENTS

| | | | |
|---|---|---|---|
| 8,286,011 | B2 | 10/2012 | Satsangi et al. |
| 8,305,958 | B2 | 11/2012 | Iyer et al. |
| 8,566,625 | B2 | 10/2013 | Gobriel et al. |
| 8,755,848 | B2 | 6/2014 | Jain et al. |
| 8,908,581 | B2 | 12/2014 | Ho et al. |
| 9,104,406 | B2 | 8/2015 | Dabagh et al. |
| 9,277,500 | B1 | 3/2016 | Solsona-Palomar et al. |
| 9,395,806 | B2 | 7/2016 | Varshney et al. |
| 9,448,614 | B2 | 9/2016 | Slik |
| 9,584,411 | B2 | 2/2017 | Iyer et al. |
| 10,080,193 | B1 * | 9/2018 | Bleu-Laine ....... H04W 52/0212 |
| 2007/0058599 | A1 | 3/2007 | Harsch |
| 2007/0077960 | A1 | 4/2007 | Jain et al. |
| 2009/0016252 | A1 | 1/2009 | Ho et al. |
| 2009/0022068 | A1 | 1/2009 | Iyer et al. |
| 2009/0135751 | A1 | 5/2009 | Hodges et al. |
| 2010/0174808 | A1 | 7/2010 | Dabagh et al. |
| 2011/0128153 | A1 | 6/2011 | Sims et al. |
| 2011/0213992 | A1 | 9/2011 | Satsangi et al. |
| 2012/0257247 | A1 | 10/2012 | Yamasaki |
| 2013/0007484 | A1 | 1/2013 | Gobriel et al. |
| 2014/0143575 | A1 | 5/2014 | Ansley |
| 2014/0161118 | A1 | 6/2014 | Iyer et al. |
| 2014/0186035 | A1 | 7/2014 | Lee et al. |
| 2014/0336839 | A1 | 11/2014 | Kuroishi |
| 2015/0143152 | A1 | 5/2015 | Varshney et al. |
| 2015/0331477 | A1 | 11/2015 | Slik |
| 2015/0382302 | A1 | 12/2015 | Davis et al. |
| 2016/0056968 | A1 | 2/2016 | Lee et al. |
| 2017/0075853 | A1 | 3/2017 | Seo et al. |

FOREIGN PATENT DOCUMENTS

| | | | |
|---|---|---|---|
| CN | 104143857 | | 11/2014 |
| CN | 104703260 | | 6/2015 |
| CN | 105429904 | A * | 3/2016 |
| EP | 3 054 651 | | 8/2016 |
| JP | 2006-245764 | | 9/2006 |
| JP | 2012-066396 | | 4/2012 |
| JP | 2014-115922 | | 6/2014 |
| JP | 6119226 | | 4/2017 |
| KR | 10-2003-0093878 | | 12/2003 |
| KR | 10-2005-0002338 | | 1/2005 |
| KR | 10-2015-0011737 | | 2/2015 |
| KR | 10-2016-0032636 | | 3/2016 |
| KR | 10-2016-0097623 | | 8/2016 |
| KR | 10-2017-0031577 | | 3/2017 |

OTHER PUBLICATIONS

International Search Report for PCT/KR2019/000547, dated May 14, 2019 4 pages.
Written Opinion of the ISA for PCT/KR2019/000547, dated May 14, 2019, 5 pages.
Notification of the First Office Action dated Oct. 9, 2021 in counterpart Chinese Application No. 201980010682.5.
Office Action dated Jun. 29, 2022 in CN Application No. 201980010682.5 and English-language translation.
Office Action dated Sep. 27, 2022 in Korean Application No. 10-2018-0013904 and partial English-language translation.

* cited by examiner

FIG. 17

| POWER MODES | SUPPLIED POWER | SECOND PROCESSOR (104) | FIRST PROCESSOR (103) | MEMORIES | | COMMUNICATION CIRCUITRY (101) | OTHER ELEMENTS (1204) (E.G.: DISPLAY) |
| --- | --- | --- | --- | --- | --- | --- | --- |
| | | | | RAM (1201) | FLASH (1202) | | |
| 1701 ULTRA POWER SAVING MODE | 0.3w | ○ | × (SECOND MODE) | ○ | × | ○ (LOW POWER) | × |
| 1702 POWER SAVING MODE | 5w | ○ | ○ (FIRST MODE) | ○ | ○ | ○ | × |
| 1703 NORMAL MODE | 140w | ○ | ○ (FIRST MODE) | ○ | ○ | ○ | ○ |

ELECTRONIC DEVICE AND CONTROL METHOD THEREFOR

This application is the U.S. national phase of International Application No. PCT/KR2019/000547 filed 14 Jan. 2019 which designated the U.S. and claims priority to KR Patent Application No. 10-2018-0013904 filed 5 Feb. 2018, the entire contents of each of which are hereby incorporated by reference.

FIELD

The disclosure relates to an electronic apparatus and a method of controlling the same, and more particularly an electronic apparatus, in which network connectivity is kept with low power, and a method of controlling the same.

DESCRIPTION OF RELATED ART

Concept of Internet of Things (IoT) requires that things, i.e. devices are always connected to a network. With development of IoT technology, scope of connectable devices has become wider and providable services have advanced, thereby requiring the devices to be connected to the Internet as well as a private network.

However, the devices connected to the Internet cannot keep the connectivity because connectivity information is deleted when a predetermined period of time elapses in a disconnected state. For example, in a case where an indoor television (TV) and an external server are connected through an indoor private network and the Internet, connectivity information inside the private network is updated•deleted when a predetermined period of time elapses, and a server outside the private network cannot continue connecting with the TV inside the private network.

Nevertheless, it is inefficient in terms of power consumption that the devices are kept turned on and continuously perform a connectivity keeping process in order to keep the connectivity with the Internet.

SUMMARY

Accordingly, an aspect of the disclosure is to provide an electronic apparatus which cab not only keep connectivity with the Internet but also reduce power consumption.

According to an embodiment of the disclosure, there is provided an electronic apparatus including: a communication circuitry; a power supply; a first processor configured to have a first mode which receives first power from the power supply and connects with a server through the communication circuitry to transmit and receive information, and a second mode which receives no power or second power lower than the first power from the power supply; and a second processor configured to repetitively output a mode switching signal within a preset range of time interval based on the second mode of the first processor, wherein the first processor is switched over to the first mode based on the mode switching signal, is configured to transmit connectivity keeping information to the server through the communication circuitry and is switched over to the second mode.

Thus, the electronic apparatus can not only keep the communication connectivity with the server but also reduce power consumption.

The connectivity keeping information may include connectivity-keeping desired time.

The connectivity keeping information may include information that allows a router provided between the communication circuitry and the server to keep address information about the electronic apparatus.

Thus, it is possible to prevent disconnection between the server and the electronic apparatus as the address information is deleted from the router.

The second processor may output the mode switching signal based on a timer event.

Thus, the electronic apparatus can achieve a configuration for repetitively keeping the network connectivity within a range of a predetermined time interval by a simple method.

The electronic apparatus may further include a power controller, wherein the power controller controls the power supply to supply the first power to the first processor based on the mode switching signal received from the second processor.

The second processor may output the mode switching signal corresponding to a communication signal received through the communication circuitry based on the second mode of the first processor, and the first processor may be switched over to the first mode based on the mode switching signal and perform a process corresponding to the communication signal.

Thus, the electronic apparatus can not only keep connectivity with the server with lower power, but also detect and process a request from the server.

The first processor may control a power mode of the electronic apparatus based on content of the communication signal in the first mode.

Thus, the electronic apparatus can not only detect and process the request from the server even in the standby mode, but also control power to be stepwise supplied based on the content of the request, thereby further enhancing power saving effects.

The first processor may control the electronic apparatus to operate in a normal mode based on a communication signal of a preset form received from another electronic apparatus within a local network.

The electronic apparatus may further include a user input receiving circuit, wherein the second processor further outputs the mode switching signal corresponding to a user input received through the user input receiving circuit, based on the second mode of the first processor, and the first processor is switched over to the first mode based on the mode switching signal and perform a process corresponding to the user input.

Thus, the electronic apparatus can detect and process a user input even in the standby mode.

According to an embodiment of the disclosure, there is provided a method of controlling an electronic apparatus including a first processor having a first mode which receives first power and transmits and receives information to and from a server through a communication circuitry, and a second mode which receives no power or second power lower than the first power, the method including: outputting a mode switching signal repetitively within a preset range of time interval based on the second mode of the first processor; and controlling the first processor to be switched over to the first mode based on the mode switching signal, to transmit connectivity keeping information to the server through the communication circuitry, and to be switched over to the second mode.

Thus, the electronic apparatus can not only keep the communication connectivity with the server but also reduce power consumption.

The connectivity keeping information may include connectivity-keeping desired time.

The connectivity keeping information may include information that allows a router provided between the communication circuitry and the server to keep address information about the electronic apparatus.

Thus, it is possible to prevent disconnection between the server and the electronic apparatus as the address information is deleted from the router.

The outputting may include outputting the mode switching signal based on a timer event.

Thus, the electronic apparatus can achieve a configuration for repetitively keeping the network connectivity within a range of a predetermined time interval by a simple method.

The electronic apparatus may further include a power controller, and the method may further include controlling the power controller to supply the first power to the first processor based on the output mode switching signal.

The method may further include: outputting the mode switching signal corresponding to a communication signal received through the communication circuitry based on the second mode of the first processor, and controlling the first processor to be switched over to the first mode based on the mode switching signal and perform a process corresponding to the communication signal.

Thus, the electronic apparatus can not only keep connectivity with the server with lower power, but also detect and process a request from the server.

The controlling may include controlling the first processor to control a power mode of the electronic apparatus based on content of the communication signal in the first mode.

Thus, the electronic apparatus can not only detect and process the request from the server even in the standby mode, but also control power to be stepwise supplied based on the content of the request, thereby further enhancing power saving effects.

The controlling may include controlling the first processor to control the electronic apparatus to operate in a normal mode based on a communication signal of a preset form received from another electronic apparatus within a local network.

The electronic apparatus may further include a user input receiving circuit, wherein the method further include outputting the mode switching signal corresponding to a user input received through the user input receiving circuit, based on the second mode of the first processor, and controlling the first processor to be switched over to the first mode based on the mode switching signal and perform a process corresponding to the user input.

Thus, the electronic apparatus can detect and process a user input even in the standby mode.

A computer program according to an embodiment of the present disclosure includes a computer program combined to the electronic apparatus and stored in a medium to achieve the method.

The computer program may be stored in a medium in a server and downloaded in the electronic apparatus through a network.

As described above, according to the disclosure, it is possible to not only keep connectivity with the Internet but also reduce power consumption.

BRIEF DESCRIPTION OF THE DRAWINGS

FIG. 17 illustrates power modes of an electronic apparatus according to an embodiment of the disclosure.

DETAILED DESCRIPTION OF EXAMPLE EMBODIMENTS

Figure 1:
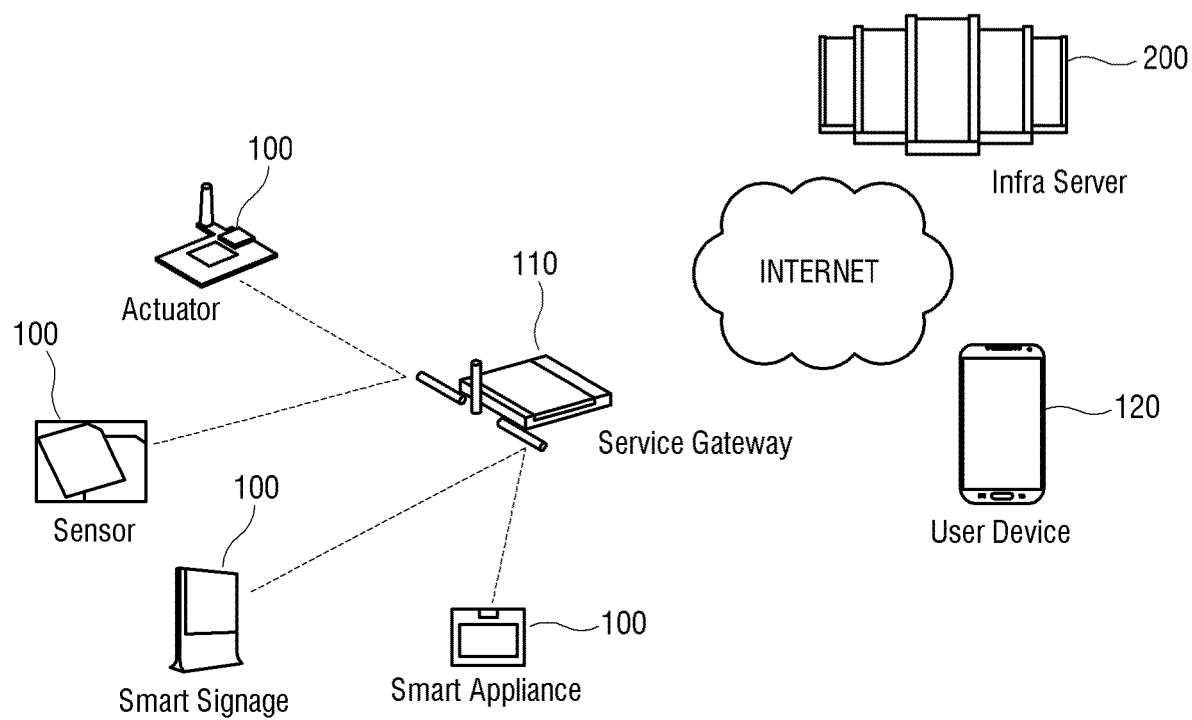
FIG. 1 illustrates a system with an electronic apparatus according to an embodiment of the present disclosure.

Below, embodiments will be described in detail with reference to accompanying drawings. In the drawings, like numerals or symbols refer to like elements having substantially the same function, and the size of each element may be exaggerated for clarity and convenience of description. However, the configurations and functions illustrated in the following embodiments are not construed as limiting the present inventive concept and the key configurations and functions. In the following descriptions, details about publicly known functions or features will be omitted if it is determined that they cloud the gist of the present inventive concept.

In the following embodiments, terms 'first', 'second', etc. are only used to distinguish one element from another, and singular forms are intended to include plural forms unless otherwise mentioned contextually. In the following embodiments, it will be understood that terms 'comprise', 'include', 'have', etc. do not preclude the presence or addition of one or more other features, numbers, steps, operations, elements, components or combination thereof. In addition, a 'module' or a 'portion' may perform at least one function or operation, be achieved by hardware, software or combination of hardware and software, and be embodied by at least one processor as integrated into at least one module. In the disclosure, at least one among a plurality of elements refers to not only all the plurality of elements but also both each one of the plurality of elements excluding the other elements and a combination thereof. Further, the expression of "configured to (or set to)" may not necessarily refer to only "specifically designed to" in terms of hardware. Instead, the "device configured to" may refer to "capable of" along with other devices or parts in a certain circumstance. For example, the phrase of "the sub processor configured to perform A, B, and C" may refer to a dedicated processor (e.g. an embedded processor) for performing the corresponding operations, or a generic-purpose processor (e.g. a central processing unit (CPU) or an application processor) for performing the corresponding operations by executing one or more software programs stored in a memory device.

FIG. 1 illustrates an electronic apparatus 100 according to an embodiment of the present disclosure. According to an embodiment of the disclosure, the electronic apparatus 100 may for example be embodied by smart home appliances, security devices, lighting fixtures, energy appliances, and so on. The smart home appliances may include a television (TV), an air conditioner, a refrigerator, a washing machine, a robot cleaner, a humidifier, a network audio system, artificial intelligence (AI) home appliances, etc.; the security devices may include a door lock system, a security camera, a closed circuit TV (CCTV), sensors for detecting a touch, a sound, a motion and the like, etc.; the lighting fixtures may include a light emitting diode (LED), a lamp, etc.; and the energy appliances may include a heater, a power meter, a power outlet, a power strip, etc. Further, the electronic apparatus 100 may be embodied by a wearable device, a computer, an Internet protocol (IP) camera, an Internet phone, a wired/wireless telephone, an electrically controllable curtain, venetian blind, etc. However, according to an embodiment of the disclosure, the electronic apparatus 100 is not limited to this, and may include any devices connectable to Internet of Things (IoT).

According to an embodiment of the disclosure, the electronic apparatus 100 is connected to a network and communicates with a server 200. The electronic apparatus 100 may perform communication with the server 200 through a router 110 (hereinafter, also referred to as a 'gateway'). Hereinafter, it will be assumed for convenience of description that the electronic apparatus 100 and the server 200 performs communication through the Internet. However, the network through which the electronic apparatus 100 and the server 200 can communicate with each other is not limited to this.

According to an embodiment of the disclosure. the electronic apparatus 100 may be controlled by a smartphone, a tablet computer, or the like user terminal 120. Meanwhile, the user terminal 120 may correspond to the electronic apparatus 100 of the disclosure.

Figure 2:
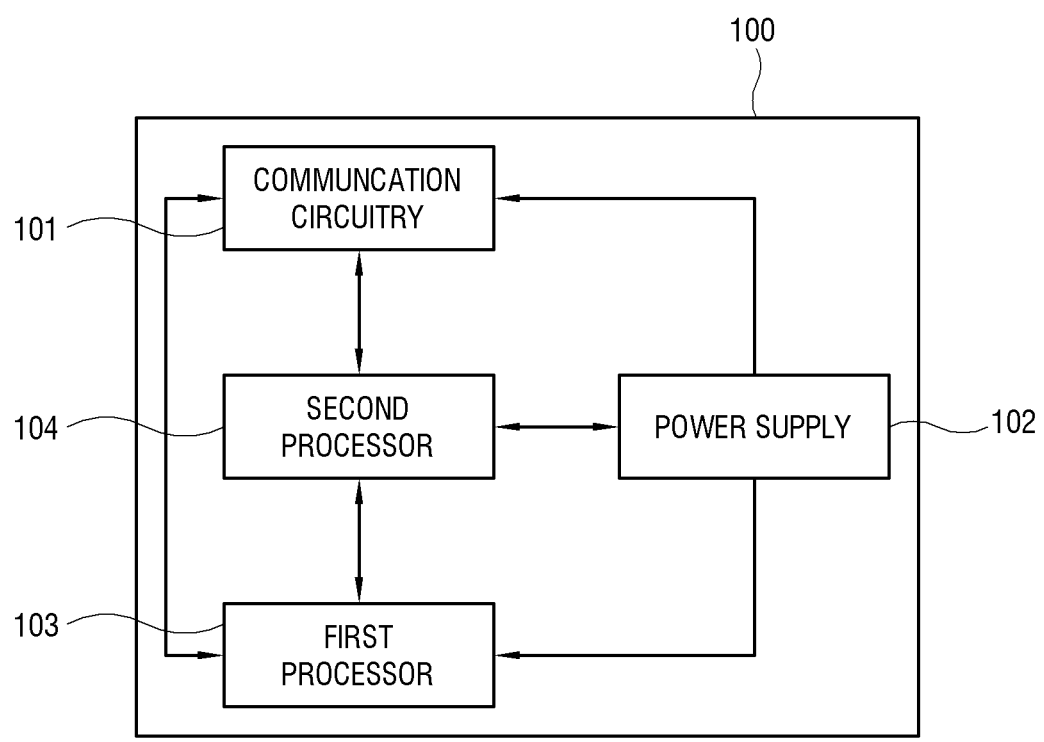
FIG. 2 illustrates a configuration of an electronic apparatus according to an embodiment of the present disclosure.

FIG. 2 is a block diagram showing a configuration of the electronic apparatus 100 according to an embodiment of the present disclosure. The electronic apparatus 100 according to an embodiment of the disclosure includes a communication circuitry 101, a power supply 102, a first processor 103, and a second processor 104. However, this configuration of the electronic apparatus 100 shown in FIG. 2 is merely an example, and the electronic apparatus 100 according to an embodiment of the disclosure may include another configuration. In other words, the electronic apparatus 100 according to an embodiment of the disclosure may include other elements in addition to the elements shown in FIG. 2, or exclude some elements from the elements shown in FIG. 2. Each element according to an embodiment of the disclosure may be embodied by at least one hardware and/or software, and may be embodied by a circuit or a chip.

The communication circuitry 101 may perform communication with an external device. For example, the communication circuitry 101 may communicate with the server 200 or other electronic apparatuses 100 and 120. The communication circuitry 101 may perform wired or wireless communication. Therefore, the communication circuitry 101 may be embodied by various communication methods as well as a connectivity unit including a connector or terminal for wired connectivity. For example, the communication circuitry 101 may be configured to perform one or more communications among Wi-Fi, Wi-Fi Direct, Bluetooth, Bluetooth low energy (BLE), serial port profile (SPP), Zigbee, infrared (IR) communication, radio control, ultra-wide band (UWB), wireless universal serial bus (USB), and near field communication (NFC).

The power supply 102 may be configured to supply power to other elements of the electronic apparatus 100, for example, the communication circuitry 101, the first processor 103, and the second processor 104. The power supply 102 may supply power to or may not supply power to other elements. The power supply 102 may supply power of differential levels to the elements.

The first processor 103 performs processes related to major functions provided by the electronic apparatus 100 according to the kinds of electronic apparatuses 100. For example, when the electronic apparatus 100 is a TV, the first processor 103 may process a video signal and an audio signal.

The first processor 103 may perform control for operating general elements of the electronic apparatus 100. For example, the electronic apparatus 100 may control the communication circuitry 101 to communicate with the server 200. The first processor 103 may include a control program (or instruction) for performing such control operations, a nonvolatile memory in which the control program is installed, a volatile memory in which at least a part of the installed control program is loaded, and at least one processor or central processing unit (CPU) for executing the loaded control program. Further, the control program may be stored in an electronic apparatus other than the electronic apparatus 100.

The control program may be achieved in the form of at least one of a basic input/output system (BIOS), a device driver, an operating system, firmware, a platform, and an application program (or an application). According to one embodiment, the application program may be previously installed or stored in the electronic apparatus 100 when the electronic apparatus 100 is manufactured, or may be installed in the electronic apparatus 100 on the basis of application program data received from the outside when used in the future. The application data may for example be downloaded from an application market and the like external server to the electronic apparatus 100, but not limited thereto. Meanwhile, the first processor 103 may be embodied in the form of a device, an S/W module, a circuit, a chip, etc. or combination thereof.

In the electronic apparatus 100 shown in FIG. 2, both the process and control are performed in the single first processor 103. However, this is merely an example, and the electronic apparatus 100 according to an alternative embodiment may include a separate controller in addition to the first processor 103.

The second processor 104 may output a mode switching signal to the first processor 103 in response to occurrence of a predetermined event. In this regard, details will be described later. Meanwhile, the foregoing descriptions about the first processor 103 are also equally applicable to the second processor 104. However, the second processor 104 may be configured to be lighter than the first processor 103 with respect to the size or performance, and configured to receive or consume lower power than the first processor 103 with respect to supplied power.

Figure 3:
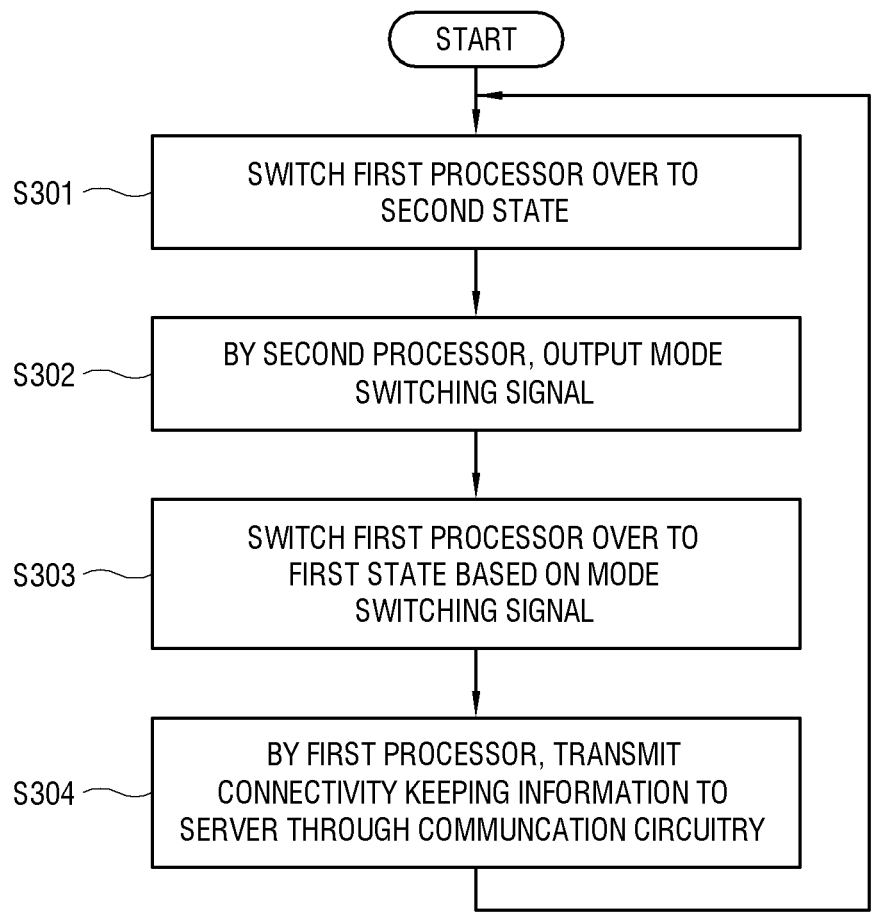
FIG. 3 illustrates a control method of an electronic apparatus according to an embodiment of the present disclosure.

FIG. 3 illustrates a control method of an electronic apparatus 100 according to an embodiment of the present disclosure.

According to an embodiment of the disclosure, the first processor 103 of the electronic apparatus 100 has a first mode to receive first power from the power supply 102, and a second mode not to receive power from the power supply 102 or to receive second power lower than the first power. In other words, the second mode includes a state that no power is supplied to the first processor 103.

In the first mode, the first processor 103 may be connected to the server 200 and transmit/receive information. In other words, the first processor 103 may control the communication circuitry 101 to transmit and receive information to and from the server 200. Meanwhile, in the second mode, the first processor 103 receives no power or power lower than the first power from the power supply 102. Therefore, power consumption in the second mode is more reduced than that of when the first processor 103 is in the first mode. However, because the power lower than the first mode is supplied in the second mode, processes performed in the second mode by the first processor 103 may be more restricted than those of when the first processor 103 is in the first mode.

The first processor 103 may be switched over from the first mode to the second mode, or from the second mode over to the first mode. For example, the modes for the first processor 103 may be switched in such a manner that the power supplied from the power supply 102 to the first processor 103 is changed under control of the second processor 104. Alternatively, the modes for the first processor 103 may be switched in such a manner that the first processor 103 directly sends a request signal for switching its own mode to the power supply 102 and the power supply 102 changes power supplied to the first processor 103 in response to the request signal. However, there are no limits to the method of switching the modes for the first processor 103.

According to an embodiment of the disclosure, the electronic apparatus 100 in the second mode may repetitively switch from the second mode over to the first mode within a range of a predetermined time interval and transmit network-connectivity keeping information to the server 200. Below, details will be described with reference to FIG. 3.

First, under a condition that the first processor 103 is in the second mode (S301), the second processor 104 outputs a mode switching signal (S302). The mode switching signal may be output in response to occurrence of a predetermined event. As an example of the event that triggers the output of the mode switching signal, there are time-out of a timer, reception of a communication signal, reception of a user input, reception of a control signal, etc. However, the kinds of events are not limited to these examples.

The mode switching signal is output to the first processor 103 and/or the power supply 102, so that the first processor 103 can be switched over to the first mode. In other words, the first processor 103 enter the first mode based on the mode switching signal (S303). The first processor 104 switched over to the first mode transmits the connectivity keeping information to the server 200 through the communication circuitry 101 (S304). After finishing the control of transmitting the connectivity keeping information to the server 200, the first processor 103 is switched over back to the second mode.

Here, the connectivity keeping information refers to information for keeping network connectivity between the electronic apparatus 100 and the server 200, and may include any information without being limited to its form or content as long as it can keep a connectivity state between the electronic apparatus 100 and the server 200.

For example, when the electronic apparatus 100 and the server 200 are configured to communicate with each other based on open connectivity foundation (OCF) specifications, the connectivity keeping information may include information based on a keepalive mechanism of the OCF specifications. This will be described with reference to FIG. 4.

Figure 4:
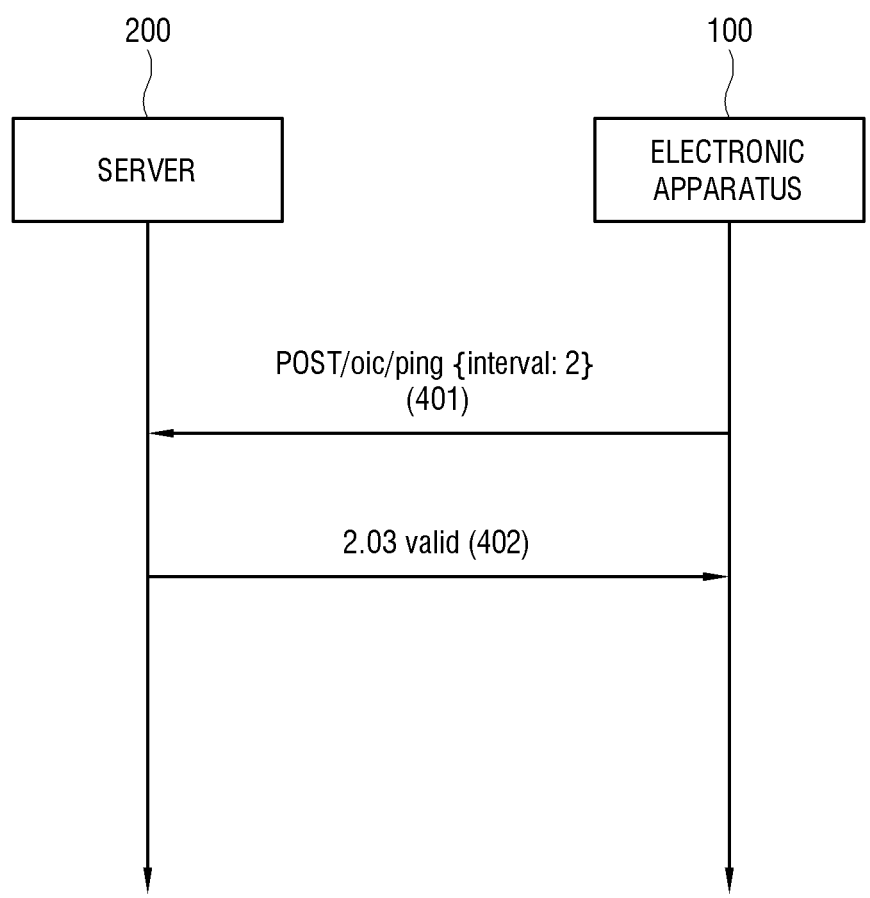
FIG. 4 illustrates an example of connectivity keeping information according to an embodiment of the disclosure.

The electronic apparatus 100 and the server 200, which communicate with each other according to the OCF specifications, may keep the connectivity in between based on the keepalive mechanism. Specifically, the electronic apparatus 100 may use a ping command on a constrained application protocol (CoAP) to make a request for keeping connectivity with the sever 200 for a predetermined period of time, and the server 200 may approve the corresponding request. In other words, the electronic apparatus 100 may for example transmit a message 401 of "POST/oic/ping {interval: 2}" to the server 200, thereby requesting connectivity to be kept for 2 minutes. In the message 401, "{interval: 2}" refers to information indicating time for which connectivity keepment is desired, which means that the connectivity with the server 200 is requested to be kept for '2 minutes'. Here, two minutes are merely an example, and may be freely changeable into another value. The server 200 that received the request may for example transmit a message 402 of "2.03 valid" as shown in FIG. 4, and approve of the request, thereby keeping the connectivity with the electronic apparatus 100. In this example, the connectivity keeping information may be a message that uses a ping command on the CoAP. The connectivity keeping information in this case may include a connectivity-keeping desired time as shown in FIG. 4.

Alternatively, the connectivity keeping information may be information that allows the router 110 positioned between the communication circuitry 101 and the server 200 to keep address information about the electronic apparatus 100. This will be described with reference to FIG. 5.

When the router 110 is present to be used for Internet communication between the server 200 and the electronic apparatus 100, the router 110 stores network address information about each electronic apparatus 100, for example, an address translation table and thus accurately transmits the request of the server 200 to the corresponding electronic apparatus 100. Meanwhile, the router 110 periodically updates the network address translation table. Because there is a limit to a total number of records in the address translation table stored in the router 110, an address of an electronic apparatus 100 that has not communicated with the server 200 for more than a predetermined period of time is deleted so that the address can be assigned to another electronic apparatus 100. Therefore, when the record of the address translation table is deleted corresponding to the electronic apparatus 100, it results in disconnecting the electronic apparatus 100 from the server 200.

Figure 5:
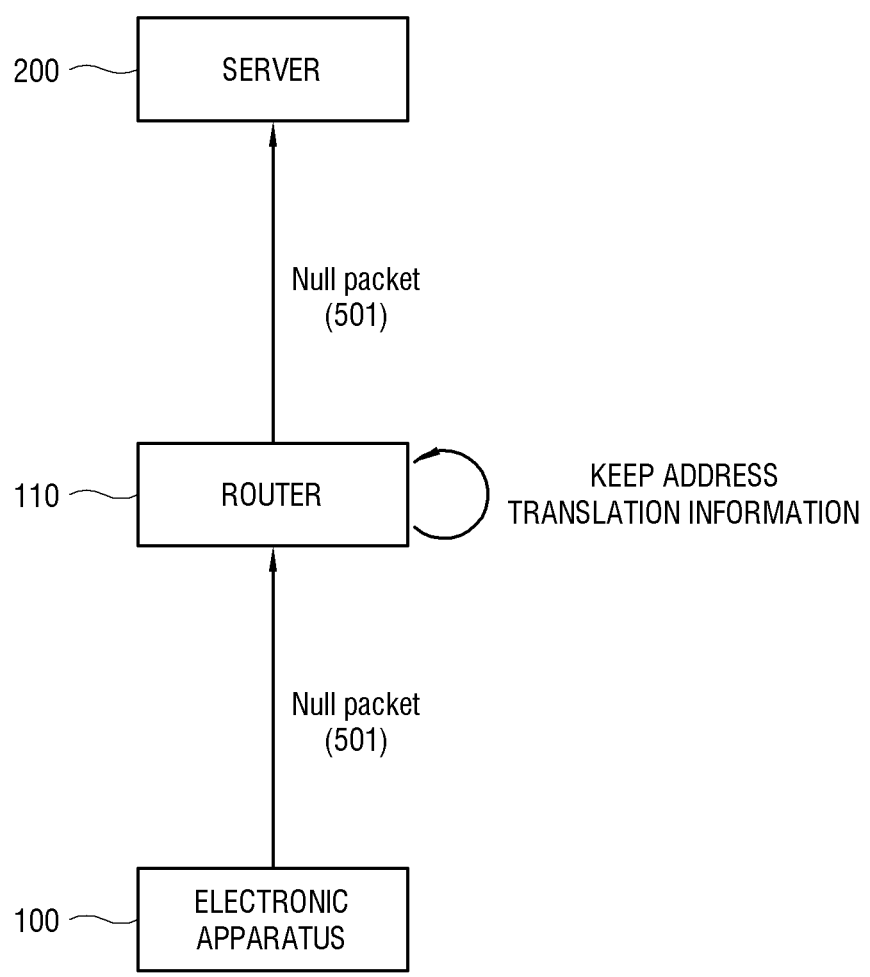
FIG. 5 illustrates an example of connectivity keeping information according to another embodiment of the disclosure.

As an example of a method of preventing such a phenomenon, the electronic apparatus 100 transmits a data packet to the server 200 via the router 110 before the network address translation table of the router 110 is updated, and informs that communication has even recently been carried out between the electronic apparatus 100 and the server 200, thereby preventing the address translation table record of the router 110 from being updated corresponding to the corresponding electronic apparatus 100. Specifically, the first processor 103 of the electronic apparatus 100 may control the communication circuitry 101 to transmit the data packet to the server 200 via the router 110. Here, there are no limits to the data packet to be transmitted to the server 200. The very fact that the data packet is transmitted is important rather than the content of the data packet, and therefore the first processor 103 may for example control null packets 501 and 502 to be transmitted as shown in FIG. 5. However, there are no limits to the kinds of packets to be transmitted. In the foregoing example, the connectivity keeping information may be used as the data packet.

Thus, the server 200 and the electronic apparatus 100 are prevented from being disconnected as the address information is deleted from the router.

As another example of the connectivity keeping information, the connectivity keeping information may include information that requests information about a client apparatus connected to the server to be kept in the server for a desired time.

Thus, the server can effectively manage the information about the client apparatus.

Referring back to FIG. 3, the operations of FIG. 3 are repetitively performed within a range of a predetermined time interval. In other words, the electronic apparatus 100 according to an embodiment of the disclosure is basically in the second mode to consume lower power than the first mode, is repetitively switched over from the second mode to the first mode within a range of a predetermined time interval to thereby transmit the connectivity keeping information to the server 200, and then returns to the second mode.

Here, the predetermined time interval is a previously specified value. The time interval may be previously specified according to the characteristics of the electronic apparatus 100 or the network to which the electronic apparatus 100 belongs, or may be previously set by a user. For example, the predetermined time interval may be based on an update time for the address information of the router 110. When the update time for the address information of the router 110 is for example changed by a firmware update or the like of the router 110, the electronic apparatus 100 may detect this change and adaptively adjust the predetermined time interval. Alternatively, when the connectivity keeping information is a message 401 of FIG. 4, the predetermined time interval may be a value corresponding to an interval in the message 401 of FIG. 4. In this case, the value may be previously set by a user.

Thus, the electronic apparatus can not only keep a connectivity state of communication with the server but also reduce power consumption.

Below, the operations of the electronic apparatus 100 according to an embodiment of the disclosure will be described in detail with reference to FIGS. 6 to 9.

Figure 6:
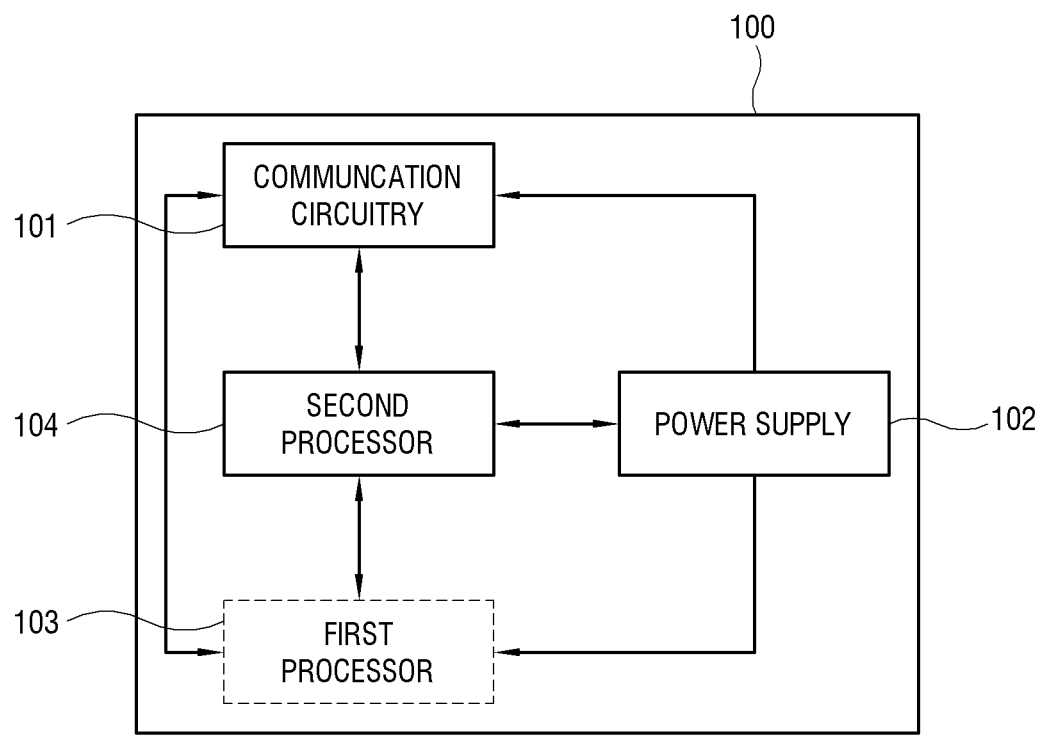
FIG. 6 illustrates a second mode of a first processor according to an embodiment of the disclosure.

FIG. 6 illustrates the second mode of the first processor 103 according to an embodiment of the disclosure. In the second mode, the first processor 103 receives power lower than the first power from the power supply 102. For example, the power supply 102 may supply the second power lower than the first power to the first processor 103, while supplying the first power, which is the same as the power supplied to the first processor 103 in the first mode, to other elements, i.e. the communication circuitry 101 and the second processor 104. Alternatively, the power supply 102 may not supply any power to the first processor 103. Therefore, the power consumed in the electronic apparatus 100 when the first processor 103 is in the second mode is less than that of when the first processor 103 is in the first mode.

Meanwhile, the foregoing example shows that the first power, which is the same as the power supplied to the first processor 103 in the first mode, is supplied to the second processor 104, but this is merely an example. Alternatively, the power supplied to the second processor 104 may be lower than the first power. Because the kinds of processes performed by the second processor 104 may be more restricted than those of the first processor 103 in the first mode and may also be more restricted than those of the first processor 103 in the second mode, it may be general that the power supplied to the second processor 104 is lower than the first power.

Figure 7:
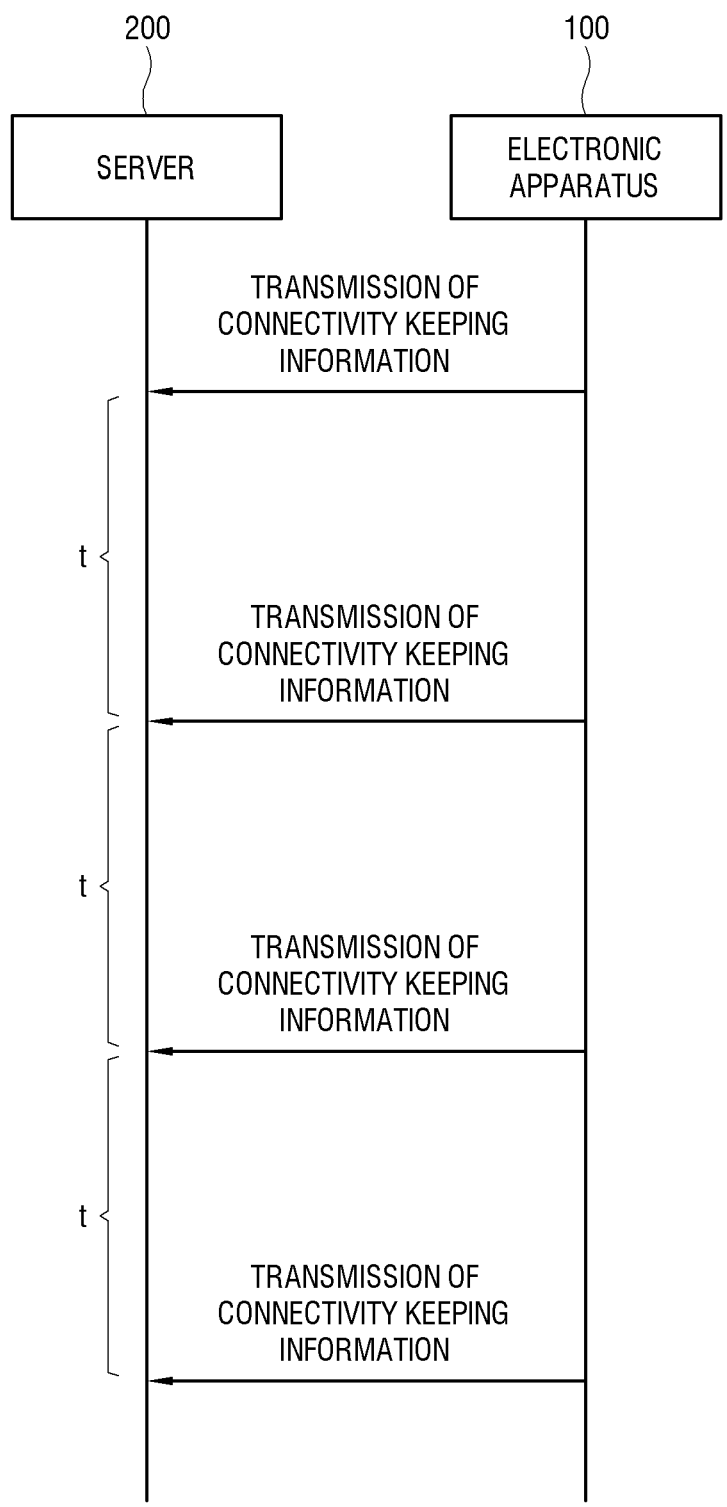
FIG. 7 illustrates an example that a first processor according to an embodiment of the disclosure transmits connectivity keeping information to a server.

When the first processor 103 is in the second mode as shown in FIG. 6, the second processor 104 repetitively outputs a mode switching signal within a range of a predetermined time interval. For example, the second processor 104 may periodically and repetitively output the mode switching signal every predetermined time interval t, so that the first processor 103 can be switched over to the first mode every predetermined time interval t and transmit the connectivity keeping information to the server 200 as shown in FIG. 7.

Figure 8:
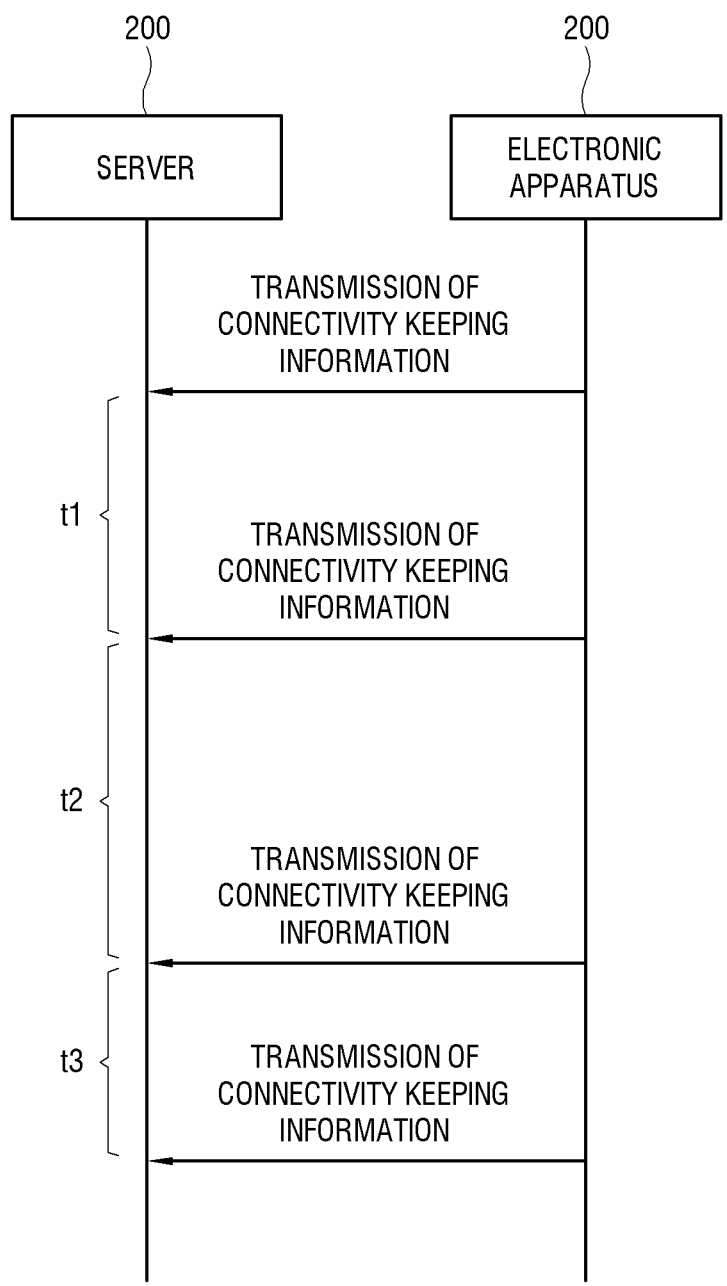
FIG. 8 illustrates another example that a first processor according to an embodiment of the disclosure transmits connectivity keeping information to a server.

However, the disclosure is not limited to the foregoing embodiment in which the second processor 104 periodically outputs the mode switching signal at equal time intervals. The time intervals at which the second processor 104 outputs the mode switching signal do not need to be regular as long as they are each shorter than the predetermined time interval t. For example, the second processor 104 may output the mode switching signal at time intervals of t1, t2 and t3 which are each shorter than t. In this case, the first processor 103 is switched over to the first mode at time intervals of t1, t2 and t3 as shown in FIG. 8 in response to the mode switching signal, and transmits the connectivity keeping information to the server 200.

Figure 9:
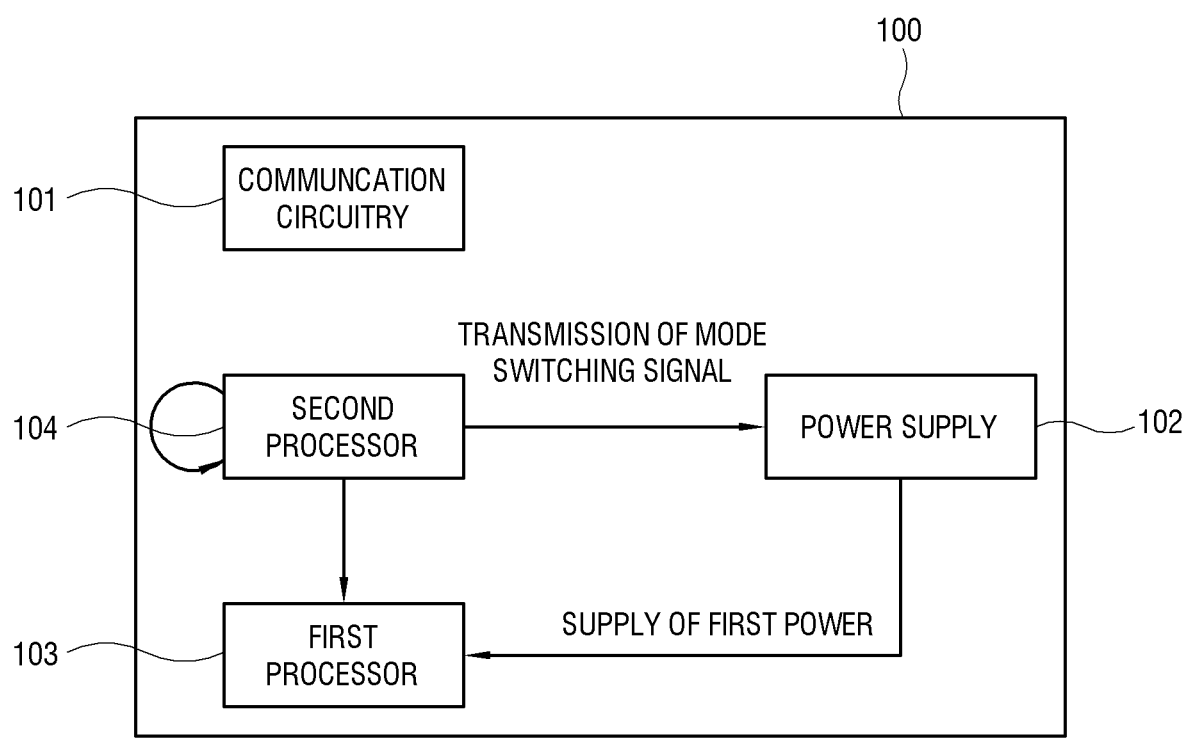
FIG. 9 illustrates an example that a first processor according to an embodiment of the disclosure is switched over to a first mode.

The first processor 103 is switched over to the first mode based on the mode switching signal output from the second processor 104. The second processor 104 outputs the mode switching signal to the power supply 102, so that the power supply 102 can supply the first power to the first processor 103 in response to the mode switching signal, thereby allowing the first processor 103 to enter the first mode. Alternatively, the second processor 104 may directly output the mode switching signal to the first processor 103, so that the first processor 103 can enter the first mode in response to the mode switching signal. FIG. 9 shows the former case. In other words, the second processor 104 of FIG. 9 outputs to the power supply 102, and the power supply 102 receives the mode switching signal and supplies the first power to the first processor 103 so that the first processor 103 can be switched over to the first mode.

The first processor 103 in the first mode transmits the connectivity keeping information to the server 200 through the communication circuitry 101. For example, the first processor 103 may control the communication circuitry 101 to transmit the connectivity keeping information shown in FIG. 4 or 5 to the server 200.

After finishing the control for transmitting the connectivity keeping information to the server 200, the first processor 103 is switched over back to the second mode. The first processor 103 may be switched over from the first mode to the second mode by various methods. For example, the first processor 103 may send a signal to the power supply 102 so that the power supply 102 which received the signal can supply the second power to the first processor 103. Alternatively, the first processor 103 may send a signal to the second processor 104, so that the second processor 104 which received the signal can control the power supply 102 to supply the second power to the first processor 103.

Thus, the first processor 103 intermittently enters the first mode and transmits the connectivity keeping information to the server 200 only when the second processor 104 outputs the mode switching signal, but otherwise is in the second mode where lower power than that of the first mode is consumed or any power is not supplied, thereby keeping the Internet connectivity of the electronic apparatus with low power.

Figure 10:
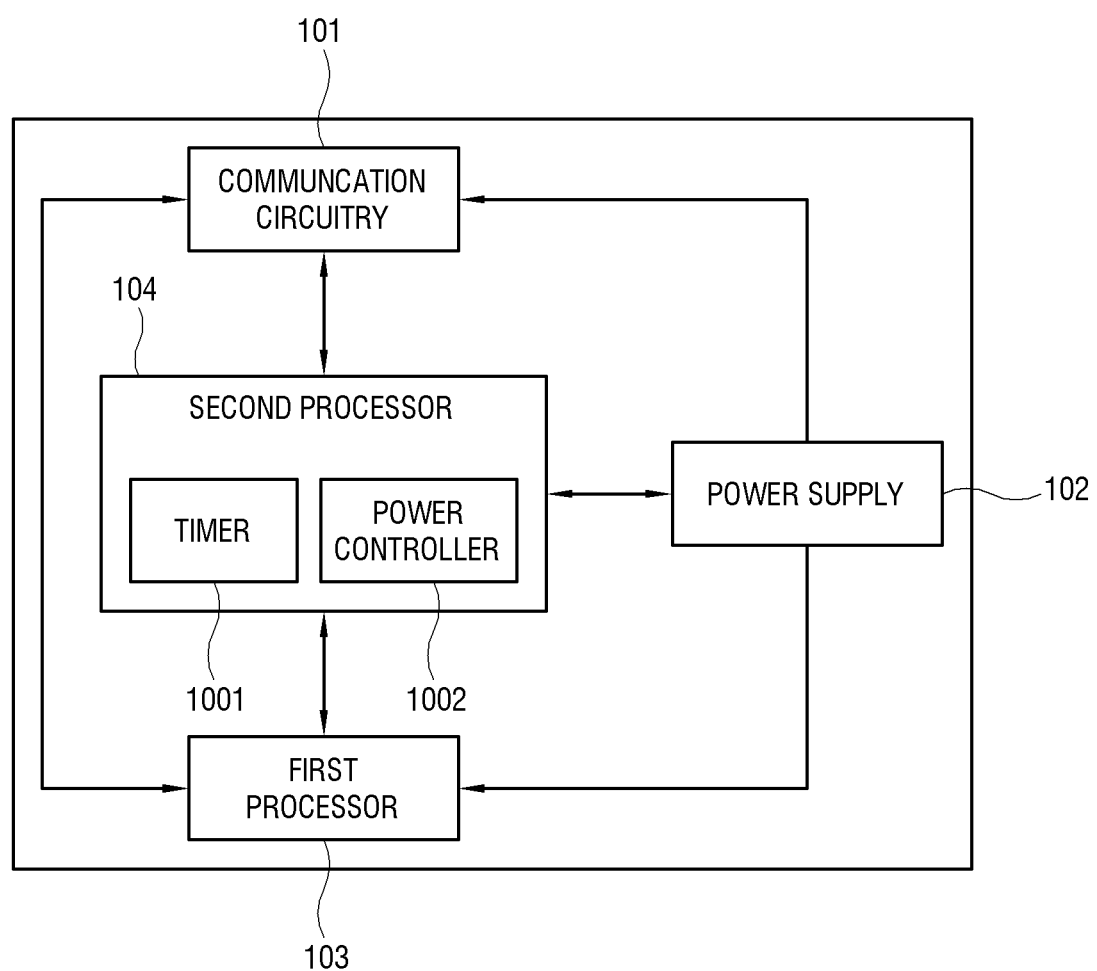
FIG. 10 illustrates an example of a detailed configuration of a second processor according to an embodiment of the disclosure.

FIG. 10 illustrates an example of a detailed configuration of the second processor 104 according to an embodiment of the disclosure.

According to an embodiment of the disclosure, the second processor 104 may include a timer. In this case, the second processor 104 may output the mode switching signal based on a timer event. For example, in a case where the timer 1001 is set to generate a time-out event whenever a predetermined period of time t elapses, the second processor 104 may output the mode switching signal in response to the time-out event of the timer 1001, so that the first processor 103 can transmit the connectivity keeping information every predetermined period of time t. Here the timer 1001 may be embodied by hardware or software.

Thus, the electronic apparatus may be embodied to have a configuration to repetitively keep network connectivity within a range of a predetermined time interval.

According to an embodiment of the disclosure, the second processor 104 further include a power controller 1002 to control the power supply 102 through the power controller 1002. In other words, the power controller 1002 may control the power supply 102 to supply the first power to the first processor 103 in response to the mode switching signal output from the second processor 104. Alternatively, the power controller 1002 may be provided separately from the second processor 104. The power controller 1002 may be embodied by software.

Meanwhile, the foregoing embodiment describes that only the first processor 103 among the elements of the electronic apparatus 100 operates in the first mode or the second mode with different supplied power, but the disclosure is not limited to this embodiment. The electronic apparatus 100 of the disclosure may operate making differences between other elements in supply of power and/or level of power according to the modes of the first processor 103. In other words, the electronic apparatus 100 of the disclosure may be changed in the whole operation mode or the power mode, based on the modes for the first processor 103. The operation mode may for example include an ultra power saving mode, a power saving mode, and a normal mode.

For example, the electronic apparatus 100 according to an embodiment of the disclosure may operate in a mode (hereinafter, referred to as the 'ultra power saving mode') where the first processor 103 is supplied with no power (i.e. the first processor is in the second mode) and the second processor 104 is supplied with power to repetitively output the mode switching signal within a range of a preset time interval. When the second processor 104 includes the timer 1001 as shown in FIG. 10, the second processor 104 in the ultra power saving mode may output the mode switching signal in response to a time-out event of the timer 1001. Further, in the ultra power saving mode, power is supplied even to the communication circuitry 101, thereby detecting whether or not the communication signal is received. Details will be described later.

For another example, the electronic apparatus 100 according to an embodiment of the disclosure may operate in a mode (hereinafter, referred to as the "power saving mode") where communication with the server 200 is possible but power is not supplied to all the elements of the electronic apparatus 100 as the first processor 103 is supplied with power to operate in the first mode and the second processor 104 and the communication circuitry 101 are supplied with power. In the power saving mode, detailed operations of the electronic apparatus 100 will be described later.

For still another example, the electronic apparatus 100 according to an embodiment of the disclosure may operate in a mode (hereinafter, referred to as the 'normal mode') where not only the first processor 103 is supplied with power to operate in the first mode but also all the elements of the electronic apparatus 100 are supplied with power. In the normal mode, all the functions of the electronic apparatus 100 are executable.

Below, exemplary operations of the electronic apparatus 100 based on the modes will be described in detail with reference to the accompanying drawings.

According to an embodiment of the disclosure, the electronic apparatus 100 may operate in the ultra power saving mode base mode set as a base mode. However, the base mode is not limited to the ultra power saving mode, and the electronic apparatus 100 may operate in another mode set as the base mode.

In the ultra power saving mode, the electronic apparatus 100 according to an embodiment of the disclosure may operate not to supply power the first processor 103 but to supply power to the second processor 104 so that the second processor 104 can repetitively output the mode switching signal within the range of the preset time interval. Further, the communication circuitry 101 may be supplied with power, thereby detecting a communication request from the server 200 in the ultra power saving mode. To this end, the communication circuitry 101 of the electronic apparatus 100 may further include a communication detector 1101. This will be described with reference to FIG. 11.

The communication circuitry 101 of the electronic apparatus 100 according to an embodiment of the disclosure may further include a communication detector 1101. The communication detector 1101 may detect whether a communication signal is received through the communication circuitry 101. Further, when it is detected that the communication signal is received, the communication detector 1101 may identify whether the corresponding communication signal is received from the server 200. For example, the communication detector 1101 may compare the IP address of the communication signal and the IP address of the server 200 to identify whether the received communication signal is received from the server 200, and transmit information about the reception of the communication signal to the second processor 104 to carry out a corresponding process only when it is identified that the received signal is received from the server 200.

Regardless of whether the first processor 103 is in the first mode or the second mode, the communication detector 1101 may carry out the foregoing process. However, the first processor 103 is highly like to be in the second mode to reduce the power consumption, and therefore it will be assumed below for convenience of description that the first processor 103 is in the second mode.

Under a condition that the first processor 103 is in the second mode, when the communication detector 1101 detects the communication signal received through the communication circuitry, the second processor 104 may output the mode switching signal in response to the event. In other words, the second processor 104 may output the mode switching signal based on the communication signal received through the communication circuitry 101 so that the first processor 103 can enter the first mode, i.e. be switched over to the power saving mode or the normal mode. The first processor 103 switched over to the first mode may perform a process corresponding to the received communication signal.

In the ultra power saving mode, a role the communication circuitry 101 needs to play may be enough to detect the communication signal, and therefore the communication circuitry 101 in this case may operate by receiving power lower than the power generally needed for carrying out all the functions of the communication circuitry 101. Thus, the electronic apparatus in the ultra power saving mode can not only keep the connectivity with the server, but also detect and process a request from the server, based on low power.

Below, operations of the electronic apparatus 100 in the power saving mode will be described in detail.

In the power saving mode, the electronic apparatus 100 according to an embodiment of the disclosure may supply power to the first processor 103 to operate in the first mode, and also supply power to the second processor 104 and the communication circuitry 101 to communicate with the server 200.

Figure 11:
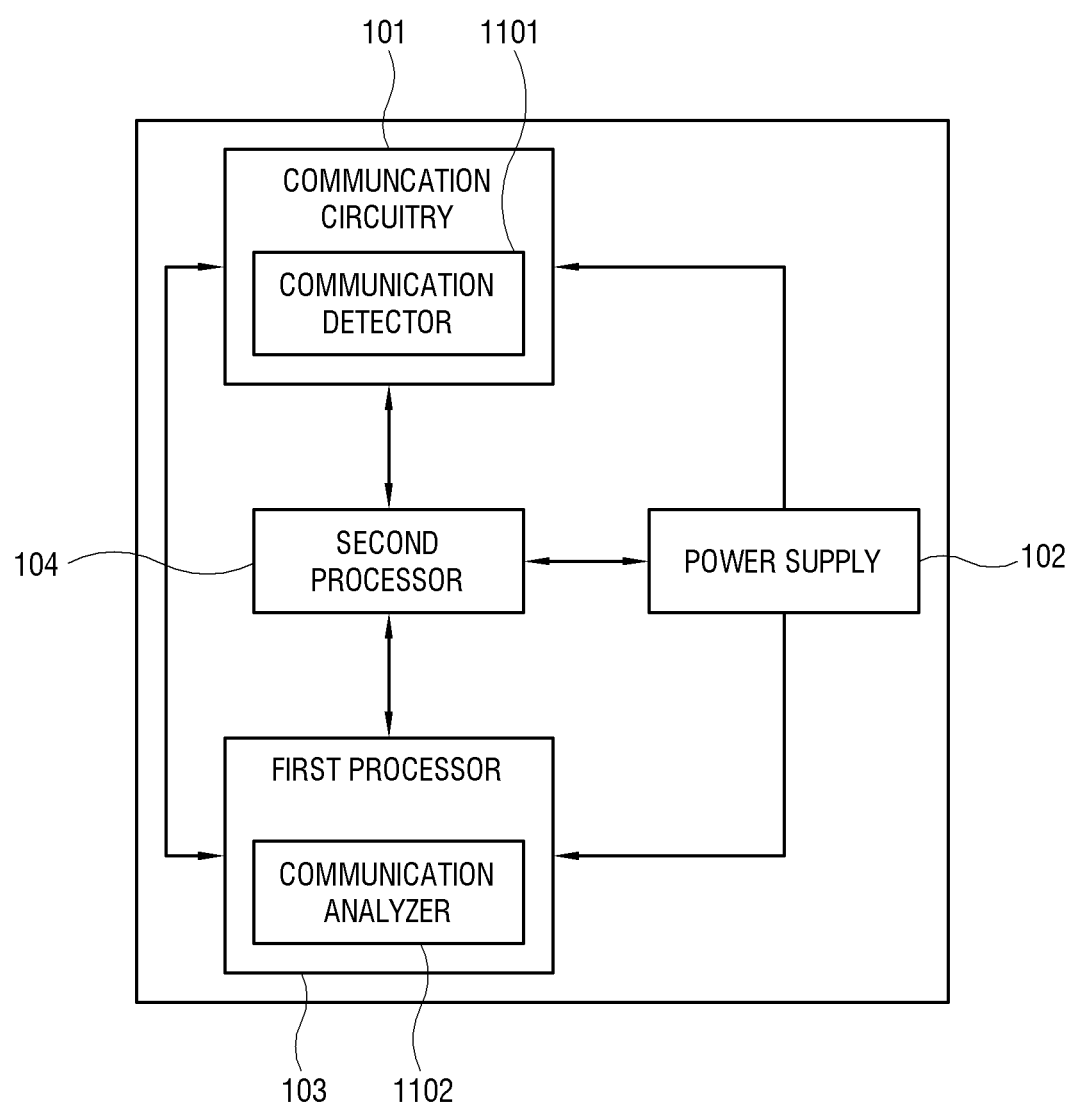
FIG. 11 illustrates a detailed configuration of an electronic apparatus according to an embodiment of the disclosure.

Further, in the power saving mode, the electronic apparatus 100 according to an embodiment of the disclosure may operate by differentially or stepwise receiving power based on the content of the communication request from the server 200. To the end, the first processor 103 may for example include a communication analyzer 1102 as shown in FIG. 11. In terms of performing a process corresponding to a received communication signal, the first processor 103 in this case may analyze the content of the communication signal and control the electronic apparatus 100 to perform the process with the minimum power needed for the process. For example, the communication analyzer 1102 of the first processor 103 analyzes the content of the communication signal received through the communication circuitry 101, and control the power mode for the electronic apparatus 100 based on the kind of process to be performed by the electronic apparatus 100 based on the analyzed content of the first processor 103.

It will be described by way of example that the electronic apparatus 100 is a TV. For example, the server 200 may transmit a communication signal for inquiring about the current state of the TV, for example, whether the TV is turned on or off. In this case, to perform a corresponding process, there are no needs of supplying power to all the elements of the TV. On the other hand, when the server 200 transmits a communication signal to the TV as a request signal for turning on the TV, there is a need of supplying power to all the elements of the TV.

Figure 12:
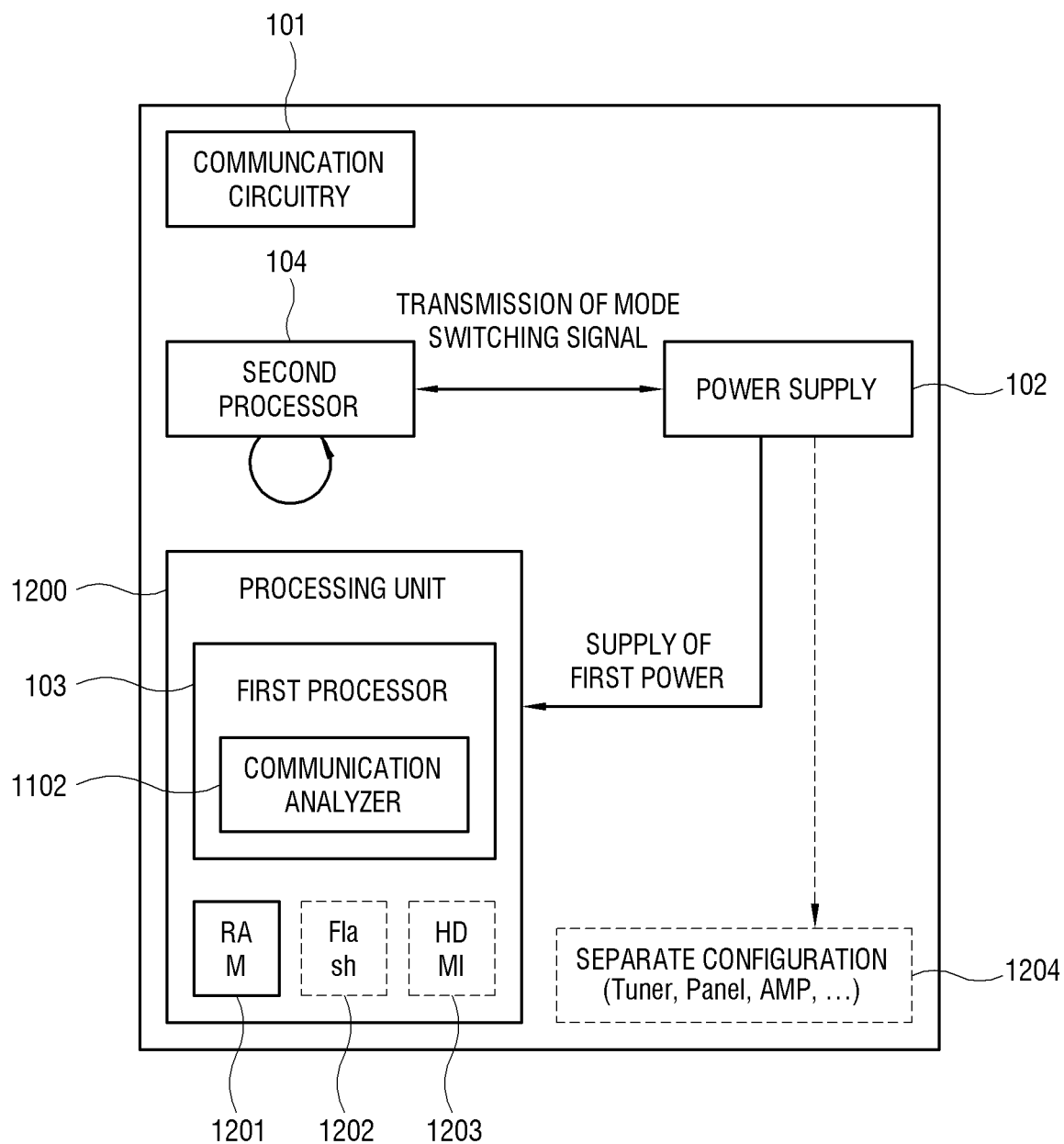
FIG. 12 illustrates an example that a first processor according to an embodiment of the disclosure is switched over to a power saving mode.

FIG. 12 illustrates an example of the electronic apparatus 100 operating in the power saving mode. The electronic apparatus 100 of FIG. 12 is a TV, in which a processing unit 1200 including the first processor 103, a random access memory (RAM) 1201, a flash memory 1202, a high definition multimedia interface (HDMI) 1203 is provided as a chip in the form of a system on chip (SoC), and the other elements such as a tuner, a panel, etc. are provided as a separate configuration 1204. When the electronic apparatus 100 receives a communication signal, which inquires about whether the TV is currently turned on or off, from the server 200, the first processor 103 switched over to the first mode based on the mode switching signal output corresponding to the reception of the communication signal identifies that the communication signal received through the communication analyzer 1102 is a request for inquiring about whether the TV is powered on or off, controls the electronic apparatus 100 to operate in the power saving mode, and performs a process corresponding to the request. Specifically, the first processor 103 identifies whether the corresponding request is processible even when power is supplied to only the first processor 103 and the RAM 1201 of the processing unit 1200, and control the power supply 102 so that the power is supplied to only the first processor 103 and the RAM 1201 and the power is not supplied to the other elements of the processing unit 1200 or the separate configuration 1204 other than the processing unit 12000 based on identification results.

Thus, the electronic apparatus in the power saving mode not only detects and processes a request from the server but also perform stepwise control for supplying power based on the content of the request, thereby further enhancing power saving effects.

Figure 13:
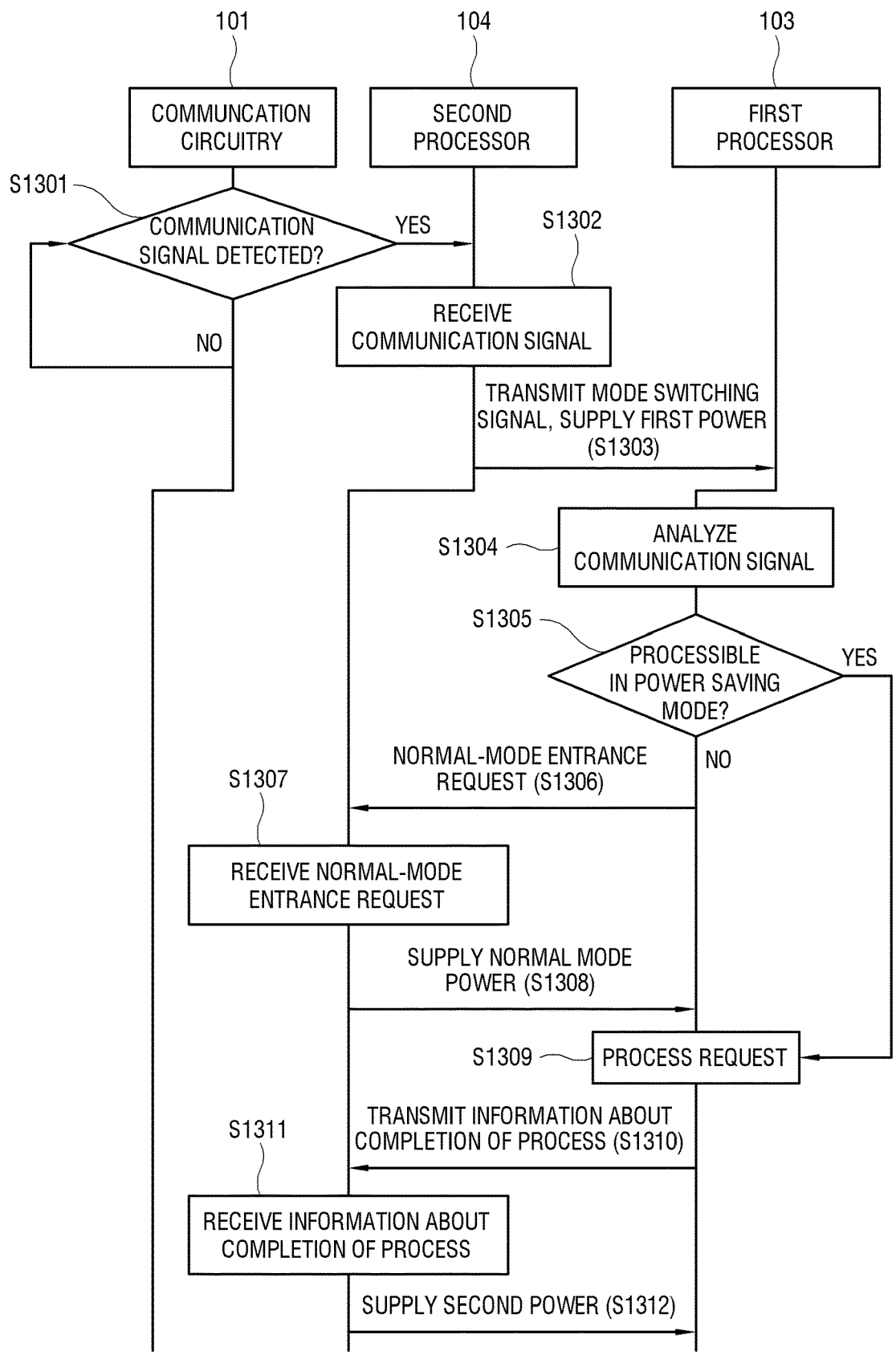
FIG. 13 illustrates a detailed control method of an electronic apparatus according to an embodiment of the disclosure.

With reference to FIG. 13, operations of the electronic apparatus 100 according to an embodiment, which differentially or stepwise receives power based on the content of the communication request from the server 200, will be described in more detail.

The communication circuitry 101 of the electronic apparatus 100 operating as the base mode, i.e. the ultra power saving mode detects the communication signal (S1301). When the communication signal is detected, the communication circuitry 101 transmits the received communication signal to the second processor 104, and the second processor 104 receives the communication signal from the communication circuitry 101 (S1302). Alternatively, the communication circuitry 101 may transmit the communication signal only when the detected communication signal is identified as a signal received from the server 200.

The second processor 104 that receives the communication signal from the communication circuitry 101 may output the mode switching signal so that the first processor 103 can be switched over to the first mode (S1303). Here the second processor 104 may directly switch the first processor 103 over to the first mode, may control the power supply 102 to supply the first power to the first processor 103 so that the first processor 103 can enter the first mode, or may control the power controller 1002 so that the first processor 103 can enter the first mode. Further, the second processor 104 may control the electronic apparatus 100 to be switched over from the ultra power saving mode to the power saving mode. Below, detailed operations at the mode switching of the first processor 103 or the mode switching of the electronic apparatus 100 will be omitted for convenience of description.

The electronic apparatus 100 switched over to the power saving mode, i.e. the first processor 103 switched over to the first mode receives and analyzes a communication signal from the second processor 104 or the communication circuitry 101 (S1304). Based on analysis results, the first processor 103 identifies whether a request corresponding to the communication signal is processible in the power saving mode of the electronic apparatus 100 (S1305). When it is identifies that the request is not processible in the power saving mode, i.e. the request needs to be processed in the normal mode, the first processor 103 controls the electronic apparatus 100 enter the normal mode. As an example of this control method, the first processor 103 may transmit a normal-mode entrance request signal to the second processor 104 (S1306), and the second processor 104 may receive the normal-mode entrance request signal and control the power supply 102 (S1307) so that the electronic apparatus 100 can receive power corresponding to the normal mode (S1308). However, this method is merely an example, and such a normal mode entrance process is not limited to this example.

The first processor 103 of the electronic apparatus 100, which enters the normal mode through the foregoing operations, processes the request corresponding to the received communication signal (S1309).

Meanwhile, when it is identified that the request corresponding to the communication signal is processible in the power saving mode of the electronic apparatus 100 (S1305) the first processor 103 processes the request corresponding to the received communication signal under the power saving mode without being switched over to the normal mode (S1309).

The first processor 103 is switched over back to the second mode after processing the request corresponding to the received communication signal. For example, the first processor 103 transmits information about the completion of the process to the second processor 104 (S1310), and the second processor 104 receives the information and controls the second power to be supplied to the first processor 103, thereby returning the first processor 103 back to the second mode. However, there are no limits to the method of switching over to the second mode.

Further, the foregoing embodiment describes that the management, switching, etc. of the power modes are generally processed by the first processor 103, but the disclosure is not limited to this embodiment. For example, the management of the power mode may be processed by the second processor 103, or by a separate processor for controlling the power mode.

Figure 14:
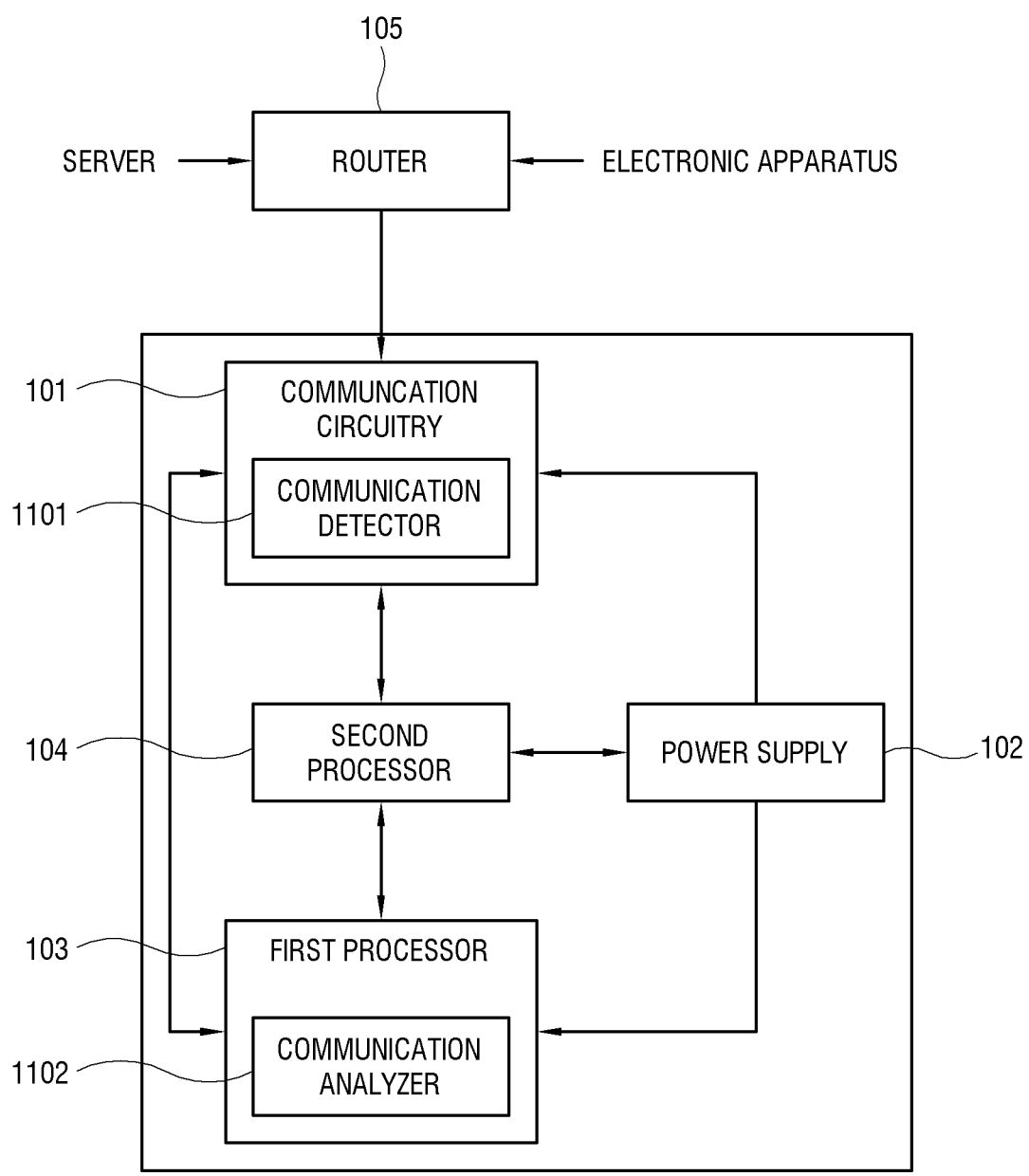
FIG. 14 illustrates a detailed configuration of an electronic apparatus according to an embodiment of the disclosure.

Meanwhile, the electronic apparatus 100 according to an embodiment of the disclosure may communicate with other electronic apparatuses than the server 200 in a local network. This is illustrated in FIG. 14. In terms of receiving the communication signal through the router 105 as shown in FIG. 14, the electronic apparatus 100 according to an embodiment of the disclosure may receive the communication signal from other electronic apparatuses as well as the server 200.

For example, the electronic apparatus 100 according to an embodiment of the disclosure may receive a communication signal from other electronic apparatuses within the local network to which the electronic apparatus 100 belongs. In this case, the first processor 103 of the electronic apparatus 100 may control the electronic apparatus 100 to operate in the normal mode when receiving a communication signal having a previously specified form from another electronic apparatus within the local network.

For example, while the electronic apparatus 100 is in the ultra power saving mode or the power saving mode, i.e. while the first processor 103 of the electronic apparatus 100 is in the second mode, the electronic apparatus 100 may receive a signal, i.e. a so-called magic packet, which wakes up the electronic apparatus 100 to the power saving mode or the normal mode based on wake-on-LAN (WoL) or wake on wireless (WoW) technology, from other electronic apparatuses within the local network. Because the content of the magic packet, in particular, the content in a packet header is different from those of other data packets, the communication detector 1101 of the communication circuitry 101 can identify whether the received communication signal is the magic packet or not. When the received communication signal is identified as the magic packet, this is a signal for waking up the electronic apparatus 100 from the ultra power saving mode or the power saving mode, and therefore the first processor 103 controls the electronic apparatus 100 to enter the power saving mode or the normal mode based on the received communication signal.

Figure 15:
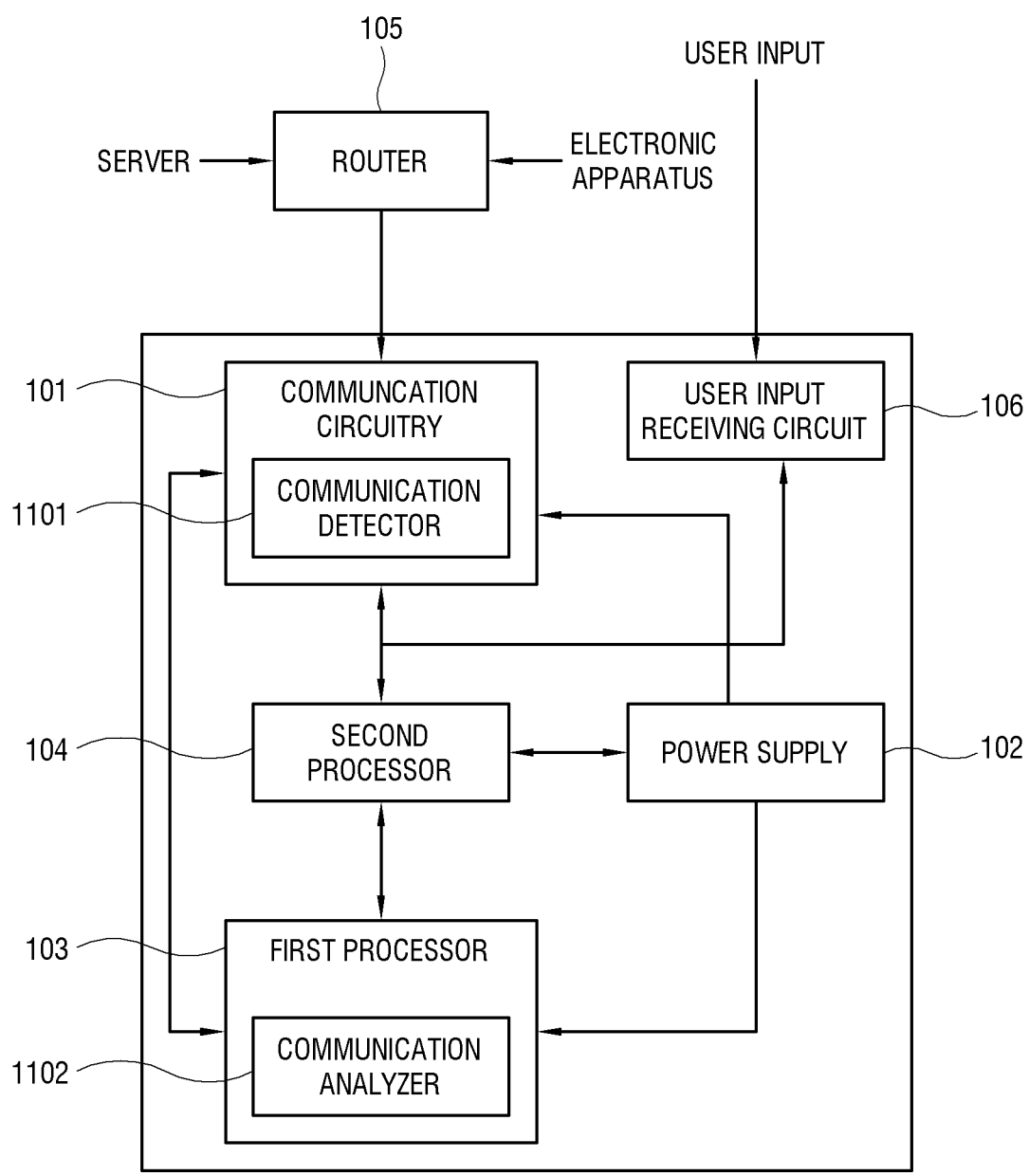
FIG. 15 illustrates a detailed configuration of an electronic apparatus according to an embodiment of the disclosure.

The electronic apparatus 100 according to an embodiment of the disclosure may receive a user input and perform operation corresponding to the user input while the electronic apparatus 100 is in the ultra power saving mode or the power saving mode. This will be described with reference to FIG. 15.

The electronic apparatus 100 according to an embodiment of the disclosure may include a user input receiving circuit 106. The user input receiving circuit 106 may receive a user's touch input or a user's remote input using a remote controller, and transmit the corresponding input to the second processor 104. Further, the user input receiving circuit 106 may be embodied by a microphone (Mic) to receive a voice input uttered by a user and transmit the received voice signal to the second processor 104. Below, for convenience of description, an embodiment that a user input is received as a remote input through the remote controller will be described, but this embodiment does not exclude a touch input, a voice input or the like other type inputs.

The second processor 104 may further output the mode switching signal in response to a user input received through the user input receiving circuit 106 while the first processor 103 is in the second mode, and the first processor 103 may be switched over to the first mode based on the mode switching signal and perform a process corresponding to the user input.

For example, when a user inputs a command for controlling the electronic apparatus 100 through the remote controller, for example, a command of 'TV power ON' while the electronic apparatus 100 is in the ultra power saving mode, the user input receiving circuit 106 receives the input command of 'TV power ON'. The second processor 104 outputs the mode switching signal in response to the input of the command, so that the first processor 103 can be switched over to the first mode. The first processor 103 switched over to the first mode performs a process based on a user input, i.e. the command of 'TV power ON'.

Here, in terms of performing the process based on the received user input, the first processor 103 may analyze the content of the received user input and control the electronic apparatus 100 to operate based on the normal mode or the power saving mode according to the kinds of process to be carried out by the electronic apparatus 100 based on the analyzed content, as described above with reference to FIGS. 12 and 13. Because the operations are performed like those shown in FIG. 12 and FIG. 13, detailed descriptions thereof will be omitted.

Thus, the electronic apparatus may detect and process the user input even in the ultra power saving mode or the power saving mode. Further, the electronic apparatus controls the power to be stepwise supplied based on the content of the input, thereby enhancing the power saving efficiency.

In the foregoing operation modes or power modes, the supply of the power and/or the level of the power are tabulated as shown in FIG. 17 with regard to the elements of the electronic apparatus 100. As shown in FIG. 17, the electronic apparatus 100 according to an embodiment of the disclosure may operate in three modes such as the ultra power saving mode, the power saving mode, and the normal mode. Based on the modes, the supply of the power is different according to the elements of the electronic apparatus 100, and thus the power supplied to the electronic apparatus 100 or total power consumed in the electronic apparatus is varied.

For example, in an ultra power saving mode 1701, power is supplied to only the second processor 104 and the communication circuitry 101 among the elements of the electronic apparatus 100, and only the RAM 1201 of the memories, but not supplied to the other elements. Because power is not supplied even to the first processor 103, the first processor is in the second mode. However, there are no limits to this, power may not be supplied even to the RAM 1201 in the ultra power saving mode 1701. Further, even though the power is supplied to the communication circuitry 101 in the ultra power saving mode, power that is lower than power normally supplied to the communication circuitry 101 may be supplied so that the communication circuitry 101 can operate with the lower power. Therefore, power of 0.3 w may be totally supplied to the electronic apparatus 100 in the ultra power saving mode.

In the power saving mode 1702 and the normal mode 1703, unlike the ultra power saving mode 1701, power is supplied to the first processor 103 and thus the first processor can operate in the first mode. Further, unlike the ultra power saving mode 1701, power is supplied even to the memory, i.e. the RAM 1201 and the flash memory 1202 in both the power saving mode 1702 and the normal mode 1703 (however, power may not be supplied to the flash memory 1202 in the power saving mode 1702). When the electronic apparatus 100 is a TV, a difference between the power saving mode 1702 and the normal mode 1703 is that power is supplied to other elements 1204 such as the display, etc. in the normal mode 1703, but not supplied in the power saving mode 1702. Due to the difference, when the electronic apparatus 100 is the TV, a total power of 140 W is needed in the normal mode 1703, but only a power of 5 W is enough in the power saving mode 1702. However, the kind and number of modes, the supply of power, and the amount of supplied power, etc. are not limited to the examples of FIG. 17.

Figure 16:
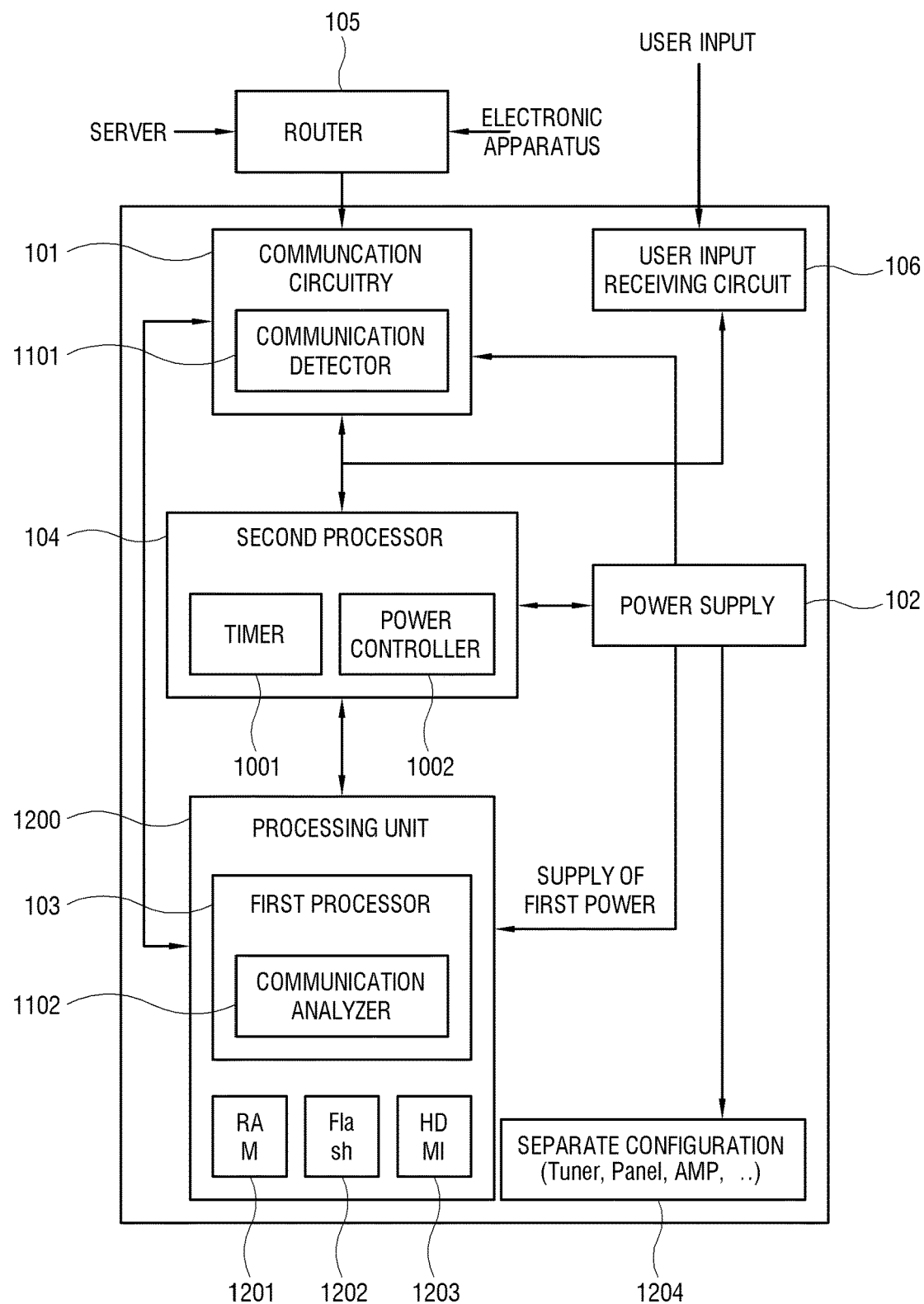
FIG. 16 illustrates a detailed configuration of an electronic apparatus according to an embodiment of the disclosure.

Although the configurations and operations of the electronic apparatus 100 according to various embodiments of the disclosure have been described, the foregoing embodiments are not exclusive to each other. For example, the electronic apparatus 100 according to an embodiment of the disclosure may include the timer 1001 as shown in FIG. 16 to output the mode switching signal based on the timer event, and at the same time may include the power controller 1002 to control the power supply 1102, may include the communication detector 1101 and the communication analyzer 1102 to detect and process a request from the server even in the ultra power saving mode and process power to be stepwise supplied based on the content of the request, and may include the user input receiving circuit 106 to detect and process a user input even in the ultra power saving mode.

The invention claimed is:

1. An electronic apparatus comprising:
a display;
communication circuitry;
a power supply;
a user input receiving circuit;
a first processor configured to have a first mode in which the first processor receives first power from the power supply and connects with a server through the communication circuitry to transmit and receive information, and a second mode in which the first processor receives no power or second power lower than the first power from the power supply; and
a second processor configured to output a mode switching signal to change an operation mode of the first processor to the first mode by controlling the power supply while the first processor operates in the second mode,
wherein the communication circuitry is configured to identify whether to transmit a communication signal to the second processor based on an Internet Protocol (IP) address of the communication signal, the communication signal being received while the first processor operates in the second mode,
wherein the second processor is configured to, in response to receiving the communication signal from the communication circuitry, control the power supply to supply the first power to the first processor such that the operation mode of the first processor is changed to the first mode,
wherein the first processor is configured to, in response to the operation mode of the first processor being changed to the first mode, analyze the communication signal, identify a kind of process to perform based on the analyzing, and control the power supply to supply power to the display based on the identification,
wherein the second processor is further configured to output the mode switching signal to change the operation mode of the first processor to the first mode in response to a user input received through the user input receiving circuit while the first processor is in the second mode.

2. The electronic apparatus according to claim 1, wherein the first processor is configured to, when the operation mode of the first processor is changed to the first mode, transmit connectivity-keeping information comprising a desired connectivity-keeping time.

3. The electronic apparatus according to claim 1, wherein the connectivity-keeping information comprises information for allowing a router provided between the communication circuitry and the server to maintain address information about the electronic apparatus.

4. The electronic apparatus according to claim 1, wherein the second processor is configured to output the mode switching signal based on a timer event.

5. The electronic apparatus according to claim 1, further comprising a power controller configured to receive the mode switching signal from the second processor,
wherein the power controller is configured to control the power supply to supply the first power to the first processor based on receiving the mode switching signal.

6. The electronic apparatus according to claim 1, wherein the first processor is configured to control a power mode of the electronic apparatus based on content of the communication signal in the first mode.

7. The electronic apparatus according to claim 6, wherein the first processor is configured to control the electronic apparatus to operate in a normal power mode based on the communication signal including preset content.

8. The electronic apparatus according to claim 1, wherein the first processor is configured to switch to the first mode based on the mode switching signal and perform a process corresponding to a user input.

9. A method of controlling an electronic apparatus comprising a display, a user input receiving circuit, and a first processor having a first mode in which the first processor receives first power from a power supply and transmits and receives information to and from a server through communication circuitry, and a second mode in which the first processor receives no power or second power lower than the first power from the power supply, the method comprising:

outputting, by a second processor, a mode switching signal to change an operation mode of the first processor to the first mode by controlling the power supply while the first processor operates in the second mode;

identifying, by the communication circuitry, whether to transmit a communication signal to the second processor based on an Internet Protocol (IP) address of the communication signal, the communication signal being received while the first processor operates in the second mode;

in response to receiving the communication signal from the communication circuitry, controlling, by the second processor, the power supply to supply the first power to the first processor such that the operation mode of the first processor is changed to the first mode;

in response to the operation mode of the first processor being changed to the first mode, analyzing, by the first processor, the communication signal, identifying a kind of process to perform based on the analysis, and controlling the power supply to supply power to the display based on the identification; and outputting, by the second processor, the mode switching signal to change the operation mode of the first processor to the first mode in response to a user input received through the user input receiving circuit while the first processor is in the second mode.

10. The method according to claim 9, further comprising transmitting, by the first processor, when the operation mode of the first processor is changed to the first mode, connectivity-keeping information comprising a desired connectivity-keeping time.

11. The method according to claim 9, wherein the connectivity-keeping information comprises information for allowing a router provided between the communication circuitry and the server to maintain address information about the electronic apparatus.

12. The method according to claim 9, wherein the outputting comprises outputting the mode switching signal based on a timer event.

13. The method according to claim 9, wherein
the electronic apparatus further comprises a power controller configured to receive the mode switching signal from the second processor, and
the method further comprises controlling the power controller to supply the first power to the first processor based on receiving the mode switching signal.

* * * * *